United States Patent
Gu et al.

(10) Patent No.: US 11,196,056 B2
(45) Date of Patent: Dec. 7, 2021

(54) PLATINUM-INDIUM CLUSTER CATALYST FOR FUEL CELL, METHOD FOR PREPARING THE SAME, AND METHOD FOR USING THE SAME

(71) Applicant: SOUTHERN UNIVERSITY OF SCIENCE AND TECHNOLOGY, Shenzhen (CN)

(72) Inventors: Meng Gu, Shenzhen (CN); Qi Wang, Shenzhen (CN); Zhiliang Zhao, Shenzhen (CN)

(73) Assignee: Southern University of Science and Technology, Guangdong (CN)

(*) Notice: Subject to any disclaimer, the term of this patent is extended or adjusted under 35 U.S.C. 154(b) by 216 days.

(21) Appl. No.: 16/670,967

(22) Filed: Oct. 31, 2019

(65) Prior Publication Data
US 2020/0381746 A1    Dec. 3, 2020

(30) Foreign Application Priority Data
May 28, 2019 (CN) .......................... 201910451116.X

(51) Int. Cl.
    H01M 8/02    (2016.01)
    H01M 4/92    (2006.01)
    H01M 4/88    (2006.01)

(52) U.S. Cl.
    CPC ........... *H01M 4/926* (2013.01); *H01M 4/881* (2013.01); *H01M 4/8882* (2013.01)

(58) Field of Classification Search
    CPC ....................................................... H01M 8/04
    See application file for complete search history.

(56) References Cited

FOREIGN PATENT DOCUMENTS

| CN | 103071805 A | 5/2013 |
|----|-------------|--------|
| CN | 109331820 A | 2/2019 |
| JP | 2007059278 A | 3/2007 |
| WO | 2012036349 A1 | 3/2012 |

OTHER PUBLICATIONS

"Oxygen reduction reaction of Pt—In alloy: combined theoretical and experimental investigations" Electrochimica Acta vol. 114, Dec. 30, 2013, pp. 706-712.*

* cited by examiner

*Primary Examiner* — Jacob B Marks
(74) *Attorney, Agent, or Firm* — Robert L. Stearns; Dickinson Wright, PLLC

(57) ABSTRACT

A method for preparing a platinum-indium cluster catalyst for a fuel cell, the method including steps of: obtaining a carbon powder, dispersing the carbon powder in a strong oxidizing solution, and performing high-temperature hydrothermal treatment to obtain an activated carbon powder; obtaining a mixed alcohol solution comprising a platinum precursor and an indium precursor; dispersing the activated carbon powder in the mixed alcohol solution, and heat treating the mixed alcohol solution to volatilize an alcohol solvent to obtain a mixed powder; and performing high-temperature treatment on the mixed powder under a mixed gas atmosphere of hydrogen and argon, to yield a platinum-indium cluster catalyst for a fuel cell.

10 Claims, 4 Drawing Sheets

PLATINUM-INDIUM CLUSTER CATALYST FOR FUEL CELL, METHOD FOR PREPARING THE SAME, AND METHOD FOR USING THE SAME

CROSS-REFERENCE TO RELATED APPLICATIONS

This application claims priority to Chinese Patent Application No. 201910451116.X filed on May 28, 2019, the content of which is incorporated herein by reference.

TECHNICAL FIELD

The present application relates to the technical field of catalysts, and more particularly to a platinum-indium cluster catalyst for a fuel cell, a method for preparing the same, and a method for using the same.

BACKGROUND

As an efficient and clean power generation device that converts a chemical energy directly into an electric energy, a fuel cell has advantages of high energy density, high conversion efficiency, low operating temperature, low pollution, and fast start and stop, and is considered to be an effective energy conversion device capable of effectively inhibiting the environmental degradation and solving the energy crisis, which is highly valued by the society. Depending on the type of electrolyte and fuel, the fuel cell can be divided into a polymer electrolyte membrane fuel cell, a direct methanol fuel cell, a phosphoric acid fuel cell, a molten carbonate fuel cell, and a solid oxide fuel cell, etc. In the polymer electrolyte membrane fuel cell and the direct methanol fuel cell, platinum is often used as a catalyst material. By absorbing hydrogen molecules onto the surface of platinum, hydrogen molecules at the absorption sites are split into atomic states, which facilitates the reaction at a low temperature. In order to acquire relatively large power output, a large amount of platinum is needed as a catalyst in the fuel cell, however, platinum has a high price, rare reserve, and high cost of use, and poor stability in catalyzing the oxygen reduction reaction, thereby being difficult to meet the commercial application of the fuel cell. Over the past decade, researchers have done extensive research to improve the catalytic activity and stability of the catalyst and to reduce the load of the precious metal catalyst, thereby meeting the cost requirements of fuel cell on its commercial applications.

However, in the current study of catalysts for a fuel cell, most of the preparation method has low catalyst yield and small output. Although some preparation processes reduce the load of the platinum precious metal, most of these preparation processes involves costly reagents, the catalytic activity is affected, the production cost is still high, and such preparation processes are only limited to small preparation in laboratories, which cannot satisfy the large demand of catalysts in industry, particularly for those large-scale manufactured and commercially available fuel cells, in addition, the catalytic activity and stability of the prepared catalyst are to be improved, thus, a more effective idea for the preparation of the catalyst is desired.

SUMMARY

It is an object of an embodiment of the present application to provide a method for preparing a platinum-indium cluster catalyst for a fuel cell, which aims at solving the technical problems that the existing method for preparation of catalysts for a fuel cell has low yield, high production cost, and is incapable of satisfying the industrial demand for a large amount of catalyst, and the catalytic activity and stability of the prepared catalyst are to be improved.

It is another object of an embodiment of the present application to provide a platinum-indium cluster catalyst for a fuel cell.

It is still another object of an embodiment of the present application to provide a fuel cell.

To achieve the above objects, the following technical solutions are adopted by the present application:

A method for preparing a platinum-indium cluster catalyst for a fuel cell, comprises steps of:

obtaining a carbon powder, dispersing the carbon powder in a strong oxidizing solution, and performing high-temperature hydrothermal treatment to obtain an activated carbon powder;

obtaining a mixed alcohol solution comprising a platinum precursor and an indium precursor;

dispersing the activated carbon powder in the mixed alcohol solution, and heat treating the mixed alcohol solution to volatilize an alcohol solvent to obtain a mixed powder; and performing high-temperature treatment on the mixed powder under a mixed gas atmosphere of hydrogen and argon, to yield a platinum-indium cluster catalyst for a fuel cell.

In an embodiment of the present application, the strong oxidizing solution is selected from a nitric acid solution having a concentration of between 1 and 16 mol/L or a sulfuric acid solution having a concentration of between 1 and 16 mol/L; and/or the step of dispersing the carbon powder in the strong oxidizing solution comprises: dispersing the carbon powder in the strong oxidizing solution according to a weight ratio of the carbon powder to the strong oxidizing solution of 1:(2-50); and/or the step of the high-temperature hydrothermal treatment comprises:

performing heat reaction on the strong oxidizing solution dispersed with the carbon powder at a temperature of between 70° C. and 160° C. for between 1 and 10 hrs; washing the carbon powder after the heat treatment to be neutral and drying to obtain the activated carbon powder.

In an embodiment of the present application, in the mixed alcohol solution, a concentration of the platinum precursor is between 1 and 10 mg/mL, and a concentration of the indium precursor is between 1 and 10 mg/mL; and/or the alcohol solvent is at least one selected from the group consisting of ethanol, methanol, and isopropanol.

In an embodiment of the present application, the platinum precursor is chloroplatinic acid, and the indium precursor is indium chloride.

In an embodiment of the present application, the step of dispersing the activated carbon powder in the mixed alcohol solution comprises: dispersing the activated carbon powder in the mixed alcohol solution according to a weight of the platinum and indium in the mixed alcohol solution accounting for between 15 wt. % and 50 wt. % of the platinum-indium cluster catalyst; and/or the step of heat treating the mixed alcohol solution to volatilize the alcohol solvent comprises: volatilizing the alcohol solvent by means of rotary evaporation at a temperature of between 50° C. and 90° C.

In an embodiment of the present application, a volume fraction of the hydrogen in the mixed gas of hydrogen and argon is between 5 v. % and 50 v. %.

In an embodiment of the present application, the step of performing high-temperature treatment on the mixed powder comprises: allowing the mixed powder to react under the mixed gas atmosphere of hydrogen and argon at between 550° C. and 850° C. for between 0.5 and 5 hrs.

In an embodiment of the present application, the step of performing high-temperature treatment on the mixed powder comprises: allowing the mixed powder to react under the mixed gas atmosphere of hydrogen and argon at between 550° C. and 850° C. for between 0.5 and 5 hrs.

A platinum-indium cluster catalyst for fuel cell, comprises: a platinum-indium cluster active particle and a carbon support. The platinum-indium cluster active particle accounts for between 15 wt. % and 50 wt. % of the platinum-indium cluster catalyst, and a particle size of the platinum-indium cluster active particle is between 1 and 5 nm.

A fuel cell, comprises: an anode, a cathode, and an electrolyte membrane disposed between the anode and the cathode. The anode and/or the cathode comprises: the platinum-indium cluster catalyst prepared according to the above-described method, or the above-described platinum-indium cluster catalyst for a fuel cell.

The method for preparing the platinum-indium cluster catalyst for a fuel cell according to embodiments of the present application is performed as follows: first, the strong oxidizing solution is adopted to perform the high-temperature hydrothermal treatment on the carbon powder, so as to activate the carbon support and form more defects sites on the surface thereof, which facilitates the absorption of the platinum precursor and the indium precursor, as well as the crystallization and nucleation of the platinum-indium alloy, such that the size of the platinum-indium alloy particle is reduced. Thereafter, the activated carbon is dispersed in the mixed alcohol solution comprising the platinum precursor and the indium precursor, a resulting mixture is heated to volatilize the alcohol solvent, to yield a mixed carbon powder comprising the platinum precursor and the indium precursor. Finally, the above mixed powder was processed with high-temperature treatment under the mixed gas atmosphere of hydrogen and argon. Based on the high-temperature reduction method, the platinum precursor and the indium precursor absorbed on the carbon powder fully react to form the platinum-indium alloy, such that intergranular atoms on the carbon support are sufficiently diffused to obtain a highly dispersed platinum-indium cluster ($Pt_3In$) having a particle size of between 1 and 5 nm. The refined platinum-indium cluster catalyst with the nanometer particle size not only effectively improves the utilization rate of the platinum precious metal, but also avoids the problem that too mall the grain size causes the agglomeration and in turn affects the catalytic effect and stability of the catalyst. At the same time, the high-temperature treatment causes platinum and indium to dope with each other. On the one hand, the electronic structure of platinum is changed by doping indium, so that the adsorption capacity of platinum for oxygen is enhanced, which is more conducive to oxygen reduction reaction, thereby improving the catalytic efficiency of the catalyst; on the other hand, the ordering degree of platinum and indium is improved, thereby improving the catalyst stability. In the preparation method of the platinum-indium cluster catalyst for a fuel cell provided by the present application, the ordering degree of the prepared platinum-indium cluster catalyst can be controlled by controlling the specific reaction temperatures, the source of the raw materials is extensive, the preparation method is simple with low preparation cost, high catalyst yield, high utilization rate of the precious metals, thereby being suitable for production in large-scale.

The platinum-indium cluster catalyst for a fuel cell provided by the present application have moderate loading capacity for the platinum-indium cluster active particles, and the platinum-indium cluster active particles have uniform particle sizes of between 1 and 5 nm, which not only increases the utilization rate of the platinum precious metal, but also effectively avoids the problems that too small the grain size causes the agglomeration and in turn affects the catalytic effect and stability of the catalyst. In addition, the platinum-indium cluster active particles are uniformly dispersed on the carbon support, the ordering degree of the platinum-indium clusters is high, the catalyst has excellent oxygen reduction catalytic performance and good catalytic stability, which can be a substitute for the commercial platinum/carbon catalyst and applied to the proton exchange membrane fuel cells and other energy conversion fields.

The anode and/or the cathode of the fuel cell provided by the present application comprises a catalyst having a uniform particle size (from 1 to 5 nm) and a uniform distribution of platinum-indium clusters, and excellent oxygen catalytic performance and catalytic stability, thereby greatly improving the energy conversion efficiency of the fuel cell.

DESCRIPTION OF THE EMBODIMENTS

Figure 1:
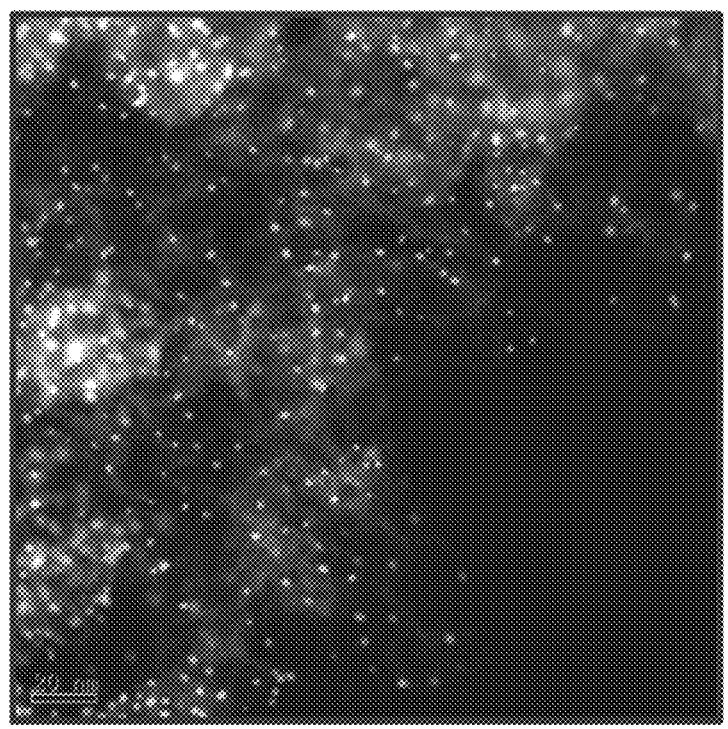
FIG. 1 is a transmission electron micrograph of a platinum-indium cluster catalyst prepared in Example 1 of the present application.

To make the objects, technical solutions, and technical effects of the present application more understandable, technical solutions in embodiments of the present application are clearly and completely described hereinbelow. It is obvious that the described embodiments are part of, rather than all, the embodiments of the present application. In conjunction with the embodiments of the present application, other embodiments obtained by those skilled in the art without departing from the inventive scope fall within the protection scope of the present application.

In the description of the present application, it is to be understood that the terms "first" and "second" are used for descriptive purposes only and are not to be construed as indicating or implying a relative importance or implicitly indicating the number of technical features indicated. Thus, features defining "first" or "second" may include one or more of the features either explicitly or implicitly. Unless otherwise specifically and exactly defined, the meaning of "a plurality" in the description of the present application refers two or more.

The weight of the relevant components mentioned in the description of the embodiments of the present application may not only refer to the specific content of each component, but also the proportional relationship of the weights between the components, and therefore, the amounts of related components fall within the protection scope of the description of the embodiments of the present application, as long as they are proportional to those indicated in the description of the embodiments of the present application. Specifically, the weights described in the description of the embodiments of the present application may be weight units well known in the chemical technical field, such as μg, mg, g, kg, and the like.

An embodiment of the present application provides a method for preparing a platinum-indium cluster catalyst for a fuel cell, the method comprises steps of:

S10, obtaining a carbon powder, dispersing the carbon powder in a strong oxidizing solution, and performing high-temperature hydrothermal treatment to obtain an activated carbon powder;

S20, obtaining a mixed alcohol solution comprising a platinum precursor and an indium precursor;

S30, dispersing the activated carbon powder in the mixed alcohol solution, and heat treating the mixed alcohol solution to volatilize an alcohol solvent to obtain a mixed powder; and S40, performing high-temperature treatment on the mixed powder under a mixed gas atmosphere of hydrogen and argon, to yield a platinum-indium cluster catalyst for a fuel cell.

The method for preparing the platinum-indium cluster catalyst for a fuel cell according to embodiments of the present application is performed as follows: first, the strong oxidizing solution is adopted to perform the high-temperature hydrothermal treatment on the carbon powder, so as to activate the carbon support and form more defects sites on the surface thereof, which facilitates the absorption of the platinum precursor and the indium precursor, as well as the crystallization and nucleation of the platinum-indium alloy, such that the size of the platinum-indium alloy particle is reduced. Thereafter, the activated carbon is dispersed in the mixed alcohol solution comprising the platinum precursor and the indium precursor, a resulting mixture is heated to volatilize the alcohol solvent, to yield a mixed carbon powder comprising the platinum precursor and the indium precursor. Finally, the above mixed powder was processed with high-temperature treatment under the mixed gas atmosphere of hydrogen and argon. Based on the high-temperature reduction method, the platinum precursor and the indium precursor absorbed on the carbon powder fully react to form the platinum-indium alloy, such that intergranular atoms on the carbon support are sufficiently diffused to obtain a highly dispersed platinum-indium cluster ($Pt_3In$) having a particle size of between 1 and 5 nm. The refined platinum-indium cluster catalyst with the nanometer particle size not only effectively improves the utilization rate of the platinum precious metal, but also avoids the problem that too mall the grain size causes the agglomeration and in turn affects the catalytic effect and stability of the catalyst. At the same time, the high-temperature treatment causes platinum and indium to dope with each other. On the one hand, the electronic structure of platinum is changed by doping indium, so that the adsorption capacity of platinum for oxygen is enhanced, which is more beneficial for oxygen reduction reaction, thereby improving the catalytic efficiency of the catalyst; on the other hand, the ordering degree of platinum and indium is improved, thereby improving the catalyst stability. In the preparation method of the platinum-indium cluster catalyst for a fuel cell provided by the present application, the ordering degree of the prepared platinum-indium cluster catalyst can be controlled by controlling the specific reaction temperatures, the source of the raw materials is extensive, the preparation method is simple with low preparation cost, high catalyst yield, high utilization rate of the precious metals, thereby being suitable for production in large-scale.

Specifically, in the above step S10, the carbon powder is acquired and is dispersed in the strong oxidizing solution for high-temperature hydrothermal treatment, thereby yielding the activated carbon powder. In this embodiment, the carbon powder is dispersed in the strong oxidizing solution, which is employed to perform the high-temperature hydrothermal treatment on the carbon, such that the carbon support is activated, the number of vacancies and the number of functional groups on the surface of the carbon powder increase, more defect sites are formed, and deposition sites for platinum and indium are increased, which facilitates the absorption of the platinum precursor and the indium precursor. In the meanwhile, the indium atoms are easily dispersed during the hydrothermal process, which is conducive to the crystallization and nucleation, and facilitates the formation rate of the ordered structure of the platinum-indium clusters, thereby lowering the particle size of the platinum-indium alloys. The carbon powder is not specifically limited in embodiments of the present application, as long as the preparation requirement can be satisfied, and the technical effect of the present application can be achieved. As a preferred embodiment, the carbon is selected from a commercial carbon KJ-600 and/or EC-300.

As a preferred embodiment, the strong oxidizing solution is selected from a nitric acid solution having a concentration of between 1 and 16 mol/L or a sulfuric acid solution having a concentration of between 1 and 16 mol/L. The embodiment of the present application adopts the nitric acid solution having a concentration of between 1 and 16 mol/L or the sulfuric acid solution having a concentration of between 1 and 16 mol/L, during the high-temperature hydrothermal process, the strong oxidizing solution of such concentration has the best modified activation on the carbon support, in this way, the vacancies and functional groups on the surface of the carbon powder are effective increased, more defect and deposition sites are formed on the surface, and the formed defect sites are uniform in their sizes and distribution. In some embodiment, the concentration of the sulfuric acid solution or the nitric acid solution may be 1 mol/L, 3 mol/L, 5 mol/L, 7 mol/L, 9 mol/L, 11 mol/L, 13 mol/L, 15 mol/L, or 16 mol/L.

As a preferred embodiment, the step of dispersing the carbon powder in the strong oxidizing solution comprises: dispersing the carbon powder in the strong oxidizing solution according to a weight ratio of the carbon powder to the strong oxidizing solution of 1:(2-50). In this embodiment of the present application, the carbon powder is dispersed in the strong oxidizing solution according to a weight ratio of the carbon powder to the strong oxidizing solution of 1:(2-50), which ensures that the carbon support is fully activated by the strong oxidizing solution during the high-temperature hydrothermal treatment. In some embodiments, the weight ratio of the carbon powder to the strong oxidizing solution may be 1:5, 1:10, 1:20, 1:30, 1:40, and 1:50.

As a preferred embodiment, the step of the high-temperature hydrothermal treatment comprises: performing heat reaction on the strong oxidizing solution dispersed with the carbon powder at a temperature of between 70° C. and 160° C. for between 1 and 10 hrs; washing the carbon powder after the heat treatment to be neutral and drying to obtain the activated carbon powder. In this embodiment of the present application, under the temperature of between 70° C. and 160° C., by performing the high-temperature hydrothermal treatment on the carbon by the strong oxidizing solution for between 1 and 10 hrs, the activation of the carbon support may be completed; thereafter, the carbon powder after the high-temperature hydrothermal treatment is washed to remove a surplus strong oxidizing solution on the surface and in the internal part of the carbon support until the carbon support approaches neutral, then, the carbon powder is dried in an oven at a temperature of between 30° C. and 160° C., so as to obtain the activated carbon. Not only is the residual strong oxidizing solution volatilized in the subsequent drying process to pollute the environment, but also the residual acidic solution interferes the subsequent preparation process.

In some embodiments, the heat reaction is performed on the strong oxidizing solution dispersed with the carbon powder at a temperature of between 100° C. for 5 hrs; the carbon powder after the heat treatment is washed to be neutral and dried to obtain the activated carbon powder. In some embodiments, the heat reaction is performed on the strong oxidizing solution dispersed with the carbon powder at a temperature of between 120° C. for 4 hrs; the carbon powder after the heat treatment is washed to be neutral and dried to obtain the activated carbon powder. In some embodiments, the heat reaction is performed on the strong oxidizing solution dispersed with the carbon powder at a temperature of between 150° C. for 3 hrs; the carbon powder after the heat treatment is washed to be neutral and dried to obtain the activated carbon powder. In some embodiments, the heat reaction is performed on the strong oxidizing solution dispersed with the carbon powder at a temperature of between 80° C. for 8 hrs; the carbon powder after the heat treatment is washed to be neutral and dried to obtain the activated carbon powder. In some embodiments, the heat reaction is performed on the strong oxidizing solution dispersed with the carbon powder at a temperature of between 70° C. for 10 hrs; the carbon powder after the heat treatment is washed to be neutral and dried to obtain the activated carbon powder.

In some embodiments, carbon KJ-600 and/or EC-300 are obtained as a carbon support. The carbon support is dispersed in the strong oxidizing solution with a concentration of between 1 and 16 mol/L, according to a weight ratio of the carbon powder to the strong oxidizing solution of 1:(2-50). Heat reaction is performed on the strong oxidizing solution dispersed with the carbon powder at a temperature of between 70° C. and 160° C. for between 1 and 10 hrs. The carbon powder after the heat treatment is then washed to be neutral and dried to obtain the activated carbon powder.

Specifically, in step S20, the mixed alcohol solution including the platinum precursor and the indium precursor are acquired. In this embodiment of the present application, the platinum precursor and the indium precursor are dissolved in the alcohol solvent to form the mixed alcohol solution including the platinum precursor and the indium precursor. On the one hand, the solution including the platinum precursor and the indium precursor are beneficial for the absorption of the platinum and the indium by the carbon support; and on the other hand, the alcohol solvent can be easily removed in the subsequent treatment without residue. The alcohol solvent selected in this embodiment of the present application has good dissolution effect on the platinum precursor and the indium precursor, and the concentration of the alcohol solvent is not specifically limited. In some embodiments, the concentration of the alcohol solvent may be 60%, 70%, and 80%.

As a preferred embodiment, in the mixed alcohol solution, a concentration of the platinum precursor is between 1 and 10 mg/mL, and a concentration of the indium precursor is between 1 and 10 mg/mL. In this embodiment of the present application, the additions of the platinum precursor and the indium precursor in the alcohol solvent enables concentrations of both the two precursors to be controlled between 1 and 10 mg/mL, the solution including the platinum precursor and the indium precursor of such concentration intervals are conducive to the absorption of the platinum precursor and the indium precursor by the activated carbon powder. In some embodiments, the concentration of the platinum precursor in the mixed alcohol solution may be 1 mg/mL, 2 mg/mL, 4 mg/mL, 6 mg/mL, 8 mg/mL, and 10 mg/mL; and the concentration of the indium precursor may be 1 mg/mL, 2 mg/mL, 4 mg/mL, 6 mg/mL, 8 mg/mL, and 10 mg/mL.

As a preferred embodiment, the alcohol solvent is at least one selected from the group consisting of ethanol, methanol, and isopropanol.

As a preferred embodiment, the platinum precursor is chloroplatinic acid, and the indium precursor is indium chloride. In this embodiment of the present application, the chloroplatinic acid precursor and the indium chloride precursor have good solubility in the alcohol solvent, can be well absorbed by the carbon powder, which is conducive to the preparation of the platinum-indium cluster catalyst.

Specifically, in step S30, the activated carbon powder is dispersed in the mixed alcohol solution, which is performed with heat treatment to volatilize the alcohol solvent, thereby obtaining the mixed powder. In this embodiment of the present application, the activated carbon is uniformly dispersed in the mixed alcohol solution including the platinum precursor and the indium precursor, the densely and uniformly distributed defect sites on the surface of the activated carbon powder can fully absorb the platinum precursor and the indium precursor of the mixed alcohol solution. Thereafter, by the heating treatment, on the one hand, the alcohol solvent in the mixed solution is volatilized, and on the other hand, the activated carbon has improved absorption effects on the platinum precursor and the indium precursor in the mixed alcohol solution, which achieves full and complete absorption, further stabilizes the absorption effect, and finally obtain the carbon mixed power which fully absorbs the platinum precursor and the indium precursor.

As a preferred embodiment, the step of dispersing the activated carbon powder in the mixed alcohol solution comprises: dispersing the activated carbon powder in the mixed alcohol solution according to a weight of the platinum and indium in the mixed alcohol solution accounting for between 15 wt. % and 50 wt. % of the platinum-indium cluster catalyst. In this embodiment of the present application, the activated carbon powder is dispersed in the mixed alcohol solution according to a weight of the platinum and indium in the mixed alcohol solution accounting for between 15 wt. % and 50 wt. % of the platinum-indium cluster catalyst. The amount of mixing and dispersion of the activated carbon and the mixed alcohol solution is determined according to the loading amount of platinum and indium, which ensures that the defect sites on the surface of the activated carbon powder have best and full absorption effect on the platinum precursor and the indium precursor, thereby not only enabling the defect sites on the carbon surface to full absorb the platinum precursor and the indium precursor, but also avoiding source waste caused by unabsorbed, surplus platinum and indium precious metal.

As a preferred embodiment, the step of heat treating the mixed alcohol solution to volatilize the alcohol solvent comprises: volatilizing the alcohol solvent by means of rotary evaporation at a temperature of between 50° C. and 90° C. In this embodiment of the present application, the rotary evaporation is adopted, and under the condition of the temperature of between 50° C. and 90° C., not only is the complete volatilization of the alcohol solvent can be ensured, but also the carbon powder can fully contact with the platinum precursor and the indium precursor by the rotation during the evaporation process, thereby further ensuring the absorption effect.

In some embodiments, the activated carbon powder is dispersed in the mixed alcohol solution according to a weight of the platinum and indium in the mixed alcohol solution accounting for between 15 wt. % and 50 wt. % of the platinum-indium cluster catalyst. Thereafter, the alcohol solvent is volatilized by means of rotary evaporation at a temperature of between 50° C. and 90° C.

In some embodiment, the activated carbon powder may be pre-dispersed in the alcohol solvent, then the acquired platinum precursor and indium precursor are dissolved in the alcohol solvent dispersed with the activated carbon powder, such that the concentration of the platinum precursor in the mixed alcohol solution is between 1 and 10 mg/L, and the concentration of the indium precursor is between 1 and 10 mg/mL. After that, the rotary evaporation is adopted to volatilize the alcohol solvent at the temperature of between 50° C. and 90° C. to yield the mixed powder.

Specifically, in step S40, the high-temperature treatment is performed on the mixed powder under the mixed gas atmosphere of hydrogen and argon, to yield the platinum-indium cluster catalyst for a fuel cell. In this embodiment of the present application, under the mixed gas atmosphere of hydrogen and argon, the mixed powder is performed with high-temperature treatment. The high-temperature reaction is one-step reduction, in which, the platinum precursor and the indium precursor absorbed on the carbon full react to form the platinum-indium alloy via the high-temperature reduction method, and the platinum-indium intergranular atoms on the carbon support are sufficiently diffused to obtain a highly dispersed platinum-indium cluster ($Pt_3In$) having a particle size of between 1 and 5 nm. The refined platinum-indium cluster catalyst with the nanometer particle size in this embodiment of the present application not only effectively improves the utilization rate of the platinum precious metal, but also avoids the problem that too mall the grain size causes the agglomeration and in turn affects the catalytic effect and stability of the catalyst. In addition, the electronic structure of platinum is changed by doping indium, so that the adsorption capacity of platinum for oxygen is enhanced, which is more beneficial for oxygen reduction reaction, thereby improving the catalytic efficiency of the catalyst.

As a preferred embodiment, a volume fraction of the hydrogen in the mixed gas of hydrogen and argon is between 5 v. % and 50 v. %. In the mixed gas of hydrogen and argon having a volume fraction of hydrogen of being between 5 v. % and 50 v. % according to this embodiment of the present application, the mixed powder is performed with high-temperature treatment, the gas atmosphere with such a hydrogen concentration can effectively ensure the high-temperature reduction effect and the performance of the platinum-indium cluster catalyst. If the concentration of hydrogen in the mixed gas is higher than 50 v. %, the excess hydrogen will at the same time act as a catalyst for graphitizing the carbon powder, thereby destroying the feature of the carbon support. If the hydrogen concentration in the mixed gas is too low, the high-temperature reduction effect on the mixed powder will be poor.

As a preferred embodiment, the step of performing high-temperature treatment on the mixed powder comprises: allowing the mixed powder to react under the mixed gas atmosphere of hydrogen and argon at between 550° C. and 850° C. for between 0.5 and 5 hrs. In this embodiment of the present application, the mixed powder is performed with high-temperature reduction at between 550° C. and 850° C. for between 0.5 and 5 hrs, such that platinum-indium intergranular atoms on the carbon support are sufficiently diffused, such that the doping of the indium changes the electronic structure of platinum, the adsorption capacity of platinum for oxygen is enhanced, thereby allowing platinum to be easily absorbed to the surface of the catalyst, being conducive to the oxygen reduction, and improving the catalytic effect of the platinum-indium cluster catalyst. In this embodiment of the present application, the high-temperature reaction is performed at between 550° C. and 850° C., by controlling the specific reaction temperature, the ordering degree of the prepared platinum-indium cluster catalyst can be controlled, the preparation method is flexible, and the application thereof is extensive. If the temperature for the high-temperature reaction is lower than 550° C., the reduction of the mixed powder cannot be realized, the doping between the platinum and indium will result a poor diffusion effect, which in turn results in poor performance of the platinum-indium cluster catalyst and poor catalytic effect. If the temperature for the high-temperature reaction is higher than 850° C., the platinum and indium may be easily agglomerated to form clusters with large particle sizes, thereby resulting in poor catalytic effect and low utilization rate of precious metals.

As a preferred embodiment, the step of performing high-temperature treatment on the mixed powder comprises: allowing the mixed powder to react under the mixed gas atmosphere of hydrogen and argon at between 550° C. and 850° C. for between 0.5 and 5 hrs. In this embodiment of the present application, the temperature for the high-temperature reaction is controlled between 550° C. and 850° C., and the mixed powder is performed with the high-temperature reaction for between 0.5 and 5 hrs, which makes the prepared platinum-indium cluster catalyst have high ordering degree, thereby obtaining the platinum-indium cluster catalyst with an ordering structure. The synthesis of the ordering structure of the platinum-indium catalyst improves the stability of the catalyst alloy, and therefore improves the catalytic effect and prolongs the service life of the catalyst.

In some embodiments, the prepared platinum-indium cluster catalyst for a fuel cell can substitute the commercial platinum/carbon catalyst and be applied to the proton exchange membrane fuel cell as well as other energy conversion fields, thereby having practical value.

An embodiment of the present application further provides a platinum-indium cluster catalyst for a fuel cell prepared by the above-described method. The platinum-indium cluster catalyst comprises: a platinum-indium cluster active particle and a carbon support. The platinum-indium cluster active particle accounts for between 15 wt. % and 50 wt. % of the platinum-indium cluster catalyst, and a particle size of the platinum-indium cluster active particle is between 1 and 5 nm.

The platinum-indium cluster catalyst for a fuel cell provided by embodiments of the present application have moderate loading capacity for the platinum-indium cluster active particles, and the platinum-indium cluster active particles have uniform particle sizes of between 1 and 5 nm, which not only increases the utilization rate of the platinum precious metal, but also effectively avoids the problems that too small the grain size causes the agglomeration and in turn affects the catalytic effect and stability of the catalyst. In addition, the platinum-indium cluster active particles are uniformly dispersed on the carbon support, the ordering degree of the platinum-indium clusters are high, the catalyst has excellent oxygen reduction catalytic performance and good catalytic stability, which can be a substitute for the commercial platinum/carbon catalyst and applied to the proton exchange membrane fuel cells and other energy conversion fields.

As a preferred embodiment, the particle size of the platinum-indium cluster active particle in the platinum-indium cluster catalyst for a fuel cell provided by embodiments of the present application is approximately 3 nm, which ensures the utilization rate of platinum in the catalyst, the catalytic effect, and the stability of the catalyst.

An embodiment of the present application further provides a fuel cell, comprising: an anode, a cathode, and an electrolyte membrane disposed between the anode and the cathode. The anode and/or the cathode comprises: the platinum-indium cluster catalyst prepared the above-described method, or the above-described platinum-indium cluster catalyst for a fuel cell.

The anode and/or the cathode of the fuel cell provided by embodiments of the present application comprises a catalyst having a uniform particle size (from 1 to 5 nm) and a uniform distribution of platinum-indium clusters, and excellent oxygen catalytic performance and catalytic stability, thereby greatly improving the energy conversion efficiency of the fuel cell.

In order to make the above-described implementation details and operations of the present application clearly understood by those skilled in the art, and to present the significant improvements in the platinum-indium cluster catalyst for a fuel cell and the preparation method thereof provide by embodiments of the present application, the above technical solutions are illustrated by multiple examples.

Example 1

A platinum-indium cluster catalyst ($Pt_3InC/-T700$) is prepared as follows:
1) 100 mg of a KJ-600 commercial carbon was uniformly dispersed in 50 mL of a 10 mol/L nitric acid, and then performed with hydrothermal treatment at 160° C. for 6 hrs;
2) the carbon obtained in step 1) was centrifugally washed, and dried, and dispersed in an ethanol having a concentration of 2.5 mg/ml to obtain a carbon/ethanol solution;
3) 10 mg of $InCl_3.4H_2O$ and 53.3 mg of $H_2PtCl_6.6H_2O$ were dispersed in 20 ml of the carbon/ethanol solution obtained in step 2), and a mixture was stirred uniformly to obtain a mixed solution;
4) the mixed solution was performed with rotary evaporation at 60° C. to obtain a dry mixed powder; and
5) the mixed powder obtained in the step 4) was placed in a tube furnace, and a H2/Ar mixed gas having a hydrogen volume fraction of 10% was introduced for reaction at 700° C. for 2 hrs, after cooling, a platinum-indium cluster catalyst ($Pt_3In/C-T700$) was collected.

Example 2

A platinum-indium cluster catalyst ($Pt_3InC/-T550$) is prepared as follows:
1) 100 mg of a KJ-600 commercial carbon was uniformly dispersed in 50 mL of a 10 mol/L nitric acid, and then performed with hydrothermal treatment at 160° C. for 6 hrs;
2) the carbon obtained in step 1) was centrifugally washed, and dried, and dispersed in an ethanol having a concentration of 2.5 mg/ml to obtain a carbon/ethanol solution;
3) 10 mg of $InCl_3.4H_2O$ and 53.3 mg of $H_2PtCl_6.6H_2O$ were dispersed in 20 ml of the carbon/ethanol solution obtained in step 2), and a mixture was stirred uniformly to obtain a mixed solution;
4) the mixed solution was performed with rotary evaporation at 60° C. to obtain a dry mixed powder; and
5) the mixed powder obtained in the step 4) was placed in a tube furnace, and a $H_2$/Ar mixed gas having a hydrogen volume fraction of 10% was introduced for reaction at 550° C. for 2 hrs, after cooling, a platinum-indium cluster catalyst ($Pt_3InC/-T550$) was collected.

Example 3

A platinum-indium cluster catalyst ($Pt_3InC/-T800-L$) is prepared as follows:
1) 10 g of a KJ-600 commercial carbon was uniformly dispersed in 200 mL of a 15 mol/L nitric acid, and then performed with hydrothermal treatment at 160° C. for 6 hrs;
2) the carbon obtained in step 1) was centrifugally washed, and dried, and dispersed in an ethanol having a concentration of 2.5 mg/ml to obtain a carbon/ethanol solution;
3) 1 g of $InCl_3.4H_2O$ and 5.3 g of $H_2PtCl_6.6H_2O$ were dispersed in 2000 ml of the carbon/ethanol solution obtained in step 2), and a mixture was stirred uniformly to obtain a mixed solution;
4) the mixed solution was performed with rotary evaporation at 60° C. to obtain a dry mixed powder; and
5) the mixed powder obtained in the step 4) was placed in a tube furnace, and a $H_2$/Ar mixed gas having a hydrogen volume fraction of 5% was introduced for reaction at 700° C. for 3 hrs, after cooling, a platinum-indium cluster catalyst ($Pt_3InC/-T800-L$) was collected.

Comparative Example 1

Commercial Platinum/Carbon Catalyst
Further, in order to verify the progress of the platinum-indium cluster catalyst prepared by embodiments of the present application, the platinum-indium cluster catalyst ($Pt_3In/C-T700$) prepared in Example 1 of the present application and the platinum-indium cluster catalysts ($Pt_3In/C-T550$) prepared in Example 2 and the platinum-indium cluster catalysts (Pt₃InC/–T800-L) prepared in Example 3 were performed with a series of tests.

As shown in FIG. 1, the platinum-indium cluster catalyst (Pt₃In/C-T700) prepared in Example 1 was performed with a transmission electron microscopy test by the present application. As can be clearly seen from the transmission electron micrograph of FIG. 1, in the platinum-indium cluster catalyst prepared by the embodiments of the present application, the platinum-indium cluster active particles supported on the carbon support are uniformly distributed, with a particle size of 1.9±0.7 nm, thereby forming a uniform and highly dispersed structure.

Figure 2:
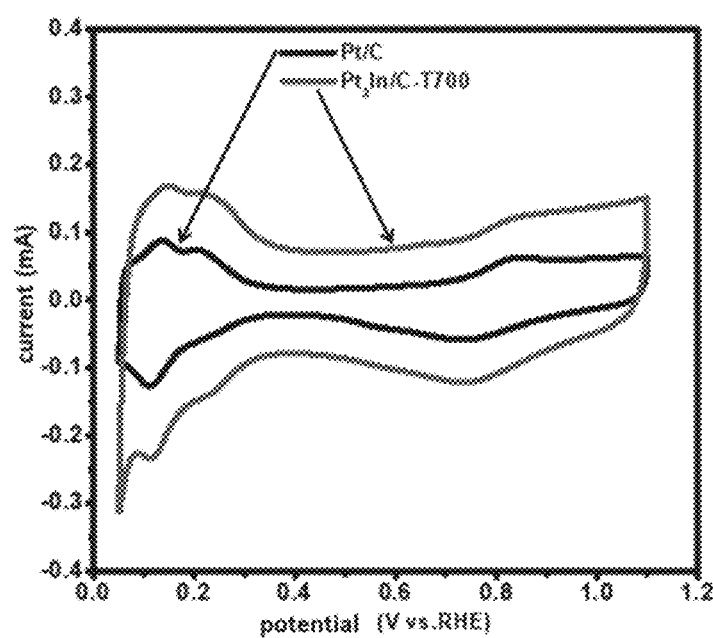
FIG. 2 is a cyclic voltammogram of a platinum-indium cluster catalyst prepared in Example 1 of the present application and a commercial platinum/carbon catalyst in a 0.1 M perchloric acid electrolyte saturated with nitrogen.

As shown in FIG. 2, the platinum-indium cluster catalyst (Pt₃In/C-T700) prepared in Example 1 and the commercial platinum/carbon catalyst provided by the Comparative Example 1 were respectively performed with an electrochemical test in a 0.1 M perchloric acid electrolyte saturated with nitrogen, and a cyclic voltammogram is shown in FIG. 2.

Figure 3:
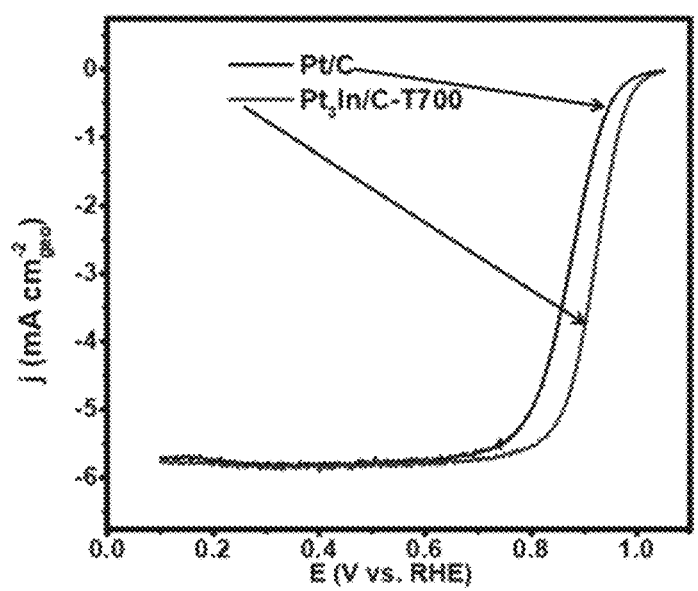
FIG. 3 is a polarization curve diagram of a platinum-indium cluster catalyst prepared in Example 1 of the present application and a commercial platinum/carbon catalyst in a 0.1 M perchloric acid electrolyte saturated with oxygen.

As shown in FIG. 3, the platinum-indium cluster catalyst (Pt₃In/C-T700) prepared in Example 1 and the commercial platinum/carbon catalyst provided by the Comparative Example 1 were performed with a polarization curve measurement in a 0.1 M perchloric acid electrolyte saturated with oxygen, and a polarization curve diagram is shown in FIG. 3.

It is known from the cyclic voltammogram of FIG. 2 and the polarization curve diagram of FIG. 3 that the platinum-indium cluster catalyst (Pt₃In/C-T700) prepared by Example 1 presents a more positive half-wave potential, thereby having better oxygen reduction catalytic activity.

Figure 4:
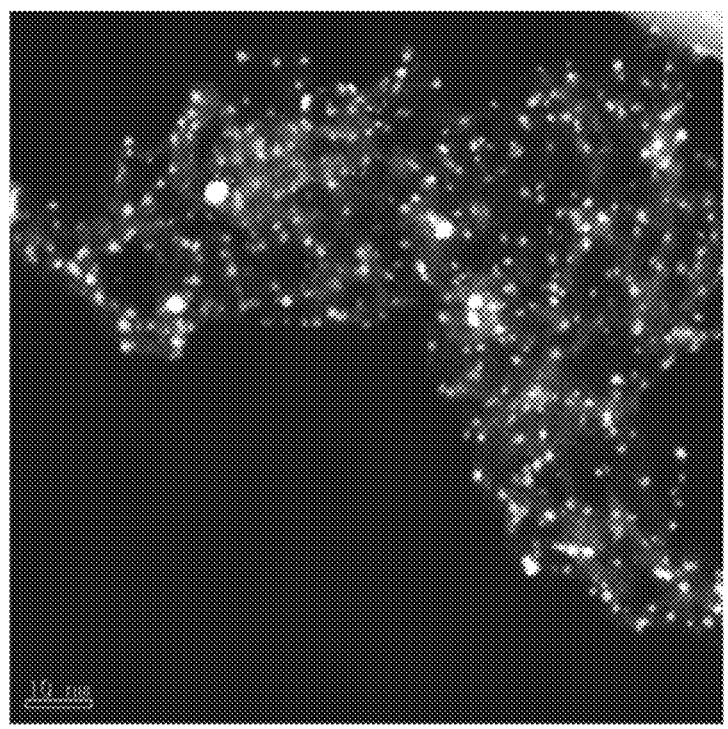
FIG. 4 is a transmission electron micrograph of a platinum-indium cluster catalyst prepared in Example 2 of the present application.

As shown in FIG. 4, the platinum-indium cluster catalyst (Pt₃InC/–T550) prepared in Example 2 was performed with a transmission electron microscopy test by the present application. As can be clearly seen from the transmission electron micrograph of FIG. 4, in the platinum-indium cluster catalyst prepared by the embodiments of the present application, the platinum-indium cluster active particles supported on the carbon support are uniformly distributed, with a particle size of 1.3±0.5 nm, thereby forming a uniform and highly dispersed structure.

Figure 5:
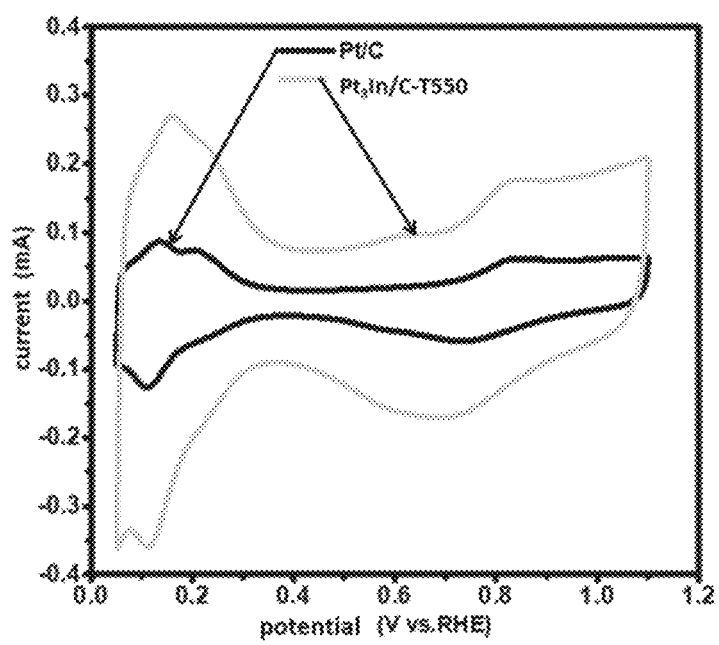
FIG. 5 is a cyclic voltammogram of a platinum-indium cluster catalyst prepared in Example 2 of the present application and a commercial platinum/carbon catalyst in a 0.1 M perchloric acid electrolyte saturated with nitrogen.

As shown in FIG. 5, the platinum-indium cluster catalyst (Pt₃InC/–T550) prepared in Example 2 and the commercial platinum/carbon catalyst provided by the Comparative Example 1 were respectively performed with an electrochemical test in a 0.1 M perchloric acid electrolyte saturated with nitrogen, and a cyclic voltammogram is shown in FIG. 5.

Figure 6:
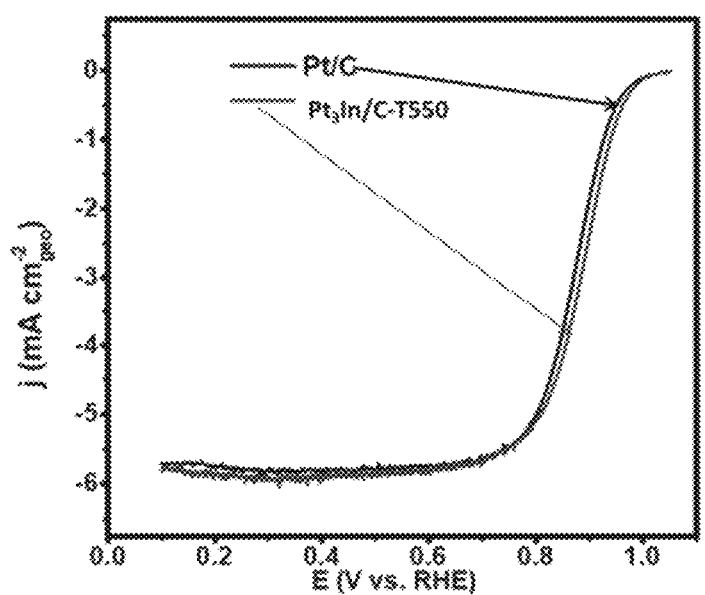
FIG. 6 is a polarization curve diagram of a platinum-indium cluster catalyst prepared in Example 2 of the present application and a commercial platinum/carbon catalyst in a 0.1 M perchloric acid electrolyte saturated with oxygen.

As shown in FIG. 6, the platinum-indium cluster catalyst (Pt₃InC/–T550) prepared in Example 2 and the commercial platinum/carbon catalyst provided by the Comparative Example 1 were performed with a polarization curve measurement in a 0.1 M perchloric acid electrolyte saturated with oxygen, and a polarization curve diagram is shown in FIG. 6.

It is known from the cyclic voltammogram of FIG. 5 and the polarization curve diagram of FIG. 6 that the platinum-indium cluster catalyst (Pt₃InC/–T550) prepared by Example 2 presents a more positive half-wave potential, thereby having better oxygen reduction catalytic activity.

Figure 7:
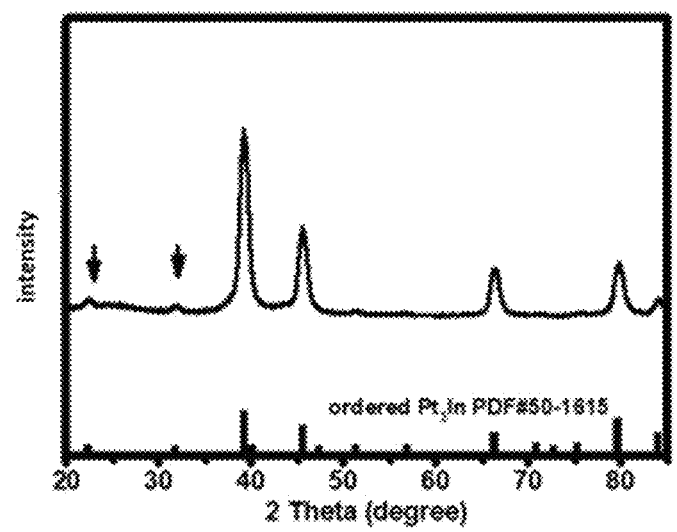
FIG. 7 is an X-ray diffraction phase analysis diagram of a platinum-indium cluster catalyst prepared in a large scale in Example 3 of the present application.

As shown in FIG. 7, the platinum-indium cluster catalyst (Pt₃InC/–T800-L) prepared in a large scale in Example 3 was performed with X-ray diffraction phase analysis. As can be seen from FIG. 7 that the platinum-indium clusters supported on the carbon support obtained from the experiment in the large-scale preparation have a highly ordered structure.

The above is only the preferred embodiments of the present application and is not intended to limit the present application. Any modifications, equivalent substitutions, and improvements made within the spirit and principles of the present application should be included in the protection scope of the present application.

What is claimed is:

1. A method for preparing a platinum-indium cluster catalyst for a fuel cell, the method comprising steps of:
   obtaining a carbon powder, dispersing the carbon powder in a strong oxidizing solution, and performing high-temperature hydrothermal treatment to obtain an activated carbon powder;
   obtaining a mixed alcohol solution comprising a platinum precursor and an indium precursor;
   dispersing the activated carbon powder in the mixed alcohol solution, and heat treating the mixed alcohol solution to volatilize an alcohol solvent to obtain a mixed powder; and
   performing high-temperature treatment on the mixed powder under a mixed gas atmosphere of hydrogen and argon, to yield a platinum-indium cluster catalyst for a fuel cell.

2. The method of claim 1, wherein the strong oxidizing solution is selected from a nitric acid solution having a concentration of between 1 and 16 mol/L or a sulfuric acid solution having a concentration of between 1 and 16 mol/L; and/or
   the step of dispersing the carbon powder in the strong oxidizing solution comprises: dispersing the carbon powder in the strong oxidizing solution according to a weight ratio of the carbon powder to the strong oxidizing solution of 1:(2-50); and/or
   the step of the high-temperature hydrothermal treatment comprises:
   performing heat reaction on the strong oxidizing solution dispersed with the carbon powder at a temperature of between 70° C. and 160° C. for between 1 and 10 hrs; washing the carbon powder after the heat treatment to be neutral and drying to obtain the activated carbon powder.

3. The method of claim 1, wherein in the mixed alcohol solution, a concentration of the platinum precursor is between 1 and 10 mg/mL, and a concentration of the indium precursor is between 1 and 10 mg/mL; and/or
   the alcohol solvent is at least one selected from the group consisting of ethanol, methanol, and isopropanol.

4. The method of claim 1, wherein the platinum precursor is chloroplatinic acid, and the indium precursor is indium chloride.

5. The method of claim 4, wherein the step of dispersing the activated carbon powder in the mixed alcohol solution comprises: dispersing the activated carbon powder in the mixed alcohol solution according to a weight of the platinum and indium in the mixed alcohol solution accounting for between 15 wt. % and 50 wt. % of the platinum-indium cluster catalyst; and/or
   the step of heat treating the mixed alcohol solution to volatilize an alcohol solvent comprises: volatilizing the alcohol solvent by means of rotary evaporation at a temperature of between 50° C. and 90° C.

6. The method of claim 1, wherein a volume fraction of the hydrogen in the mixed gas of hydrogen and argon is between 5 v. % and 50 v. %.

7. The method of claim 6, wherein the step of performing high-temperature treatment on the mixed powder comprises: allowing the mixed powder to react under the mixed gas atmosphere of hydrogen and argon at between 550° C. and 850° C. for between 0.5 and 5 hrs.

8. The method of claim 7, wherein the step of performing high-temperature treatment on the mixed powder comprises: allowing the mixed powder to react under the mixed gas atmosphere of hydrogen and argon at between 550° C. and 850° C. for between 0.5 and 5 hrs.

9. A platinum-indium cluster catalyst for fuel cell, comprising: a platinum-indium cluster active particle and a carbon support; wherein, the platinum-indium cluster active particle accounts for between 15 wt. % and 50 wt. % of the platinum-indium cluster catalyst, and a particle size of the platinum-indium cluster active particle is between 1 and 5 nm.

10. A fuel cell, comprising: an anode, a cathode, and an electrolyte membrane disposed between the anode and the cathode, wherein the anode and/or the cathode comprises the platinum-indium cluster catalyst for a fuel cell according to claim 9.

* * * * *